United States Patent [19]

Vaughan

[11] Patent Number: 5,261,188
[45] Date of Patent: Nov. 16, 1993

[54] BELT WEATHERSTRIP WITH BULB

[75] Inventor: Robert A. Vaughan, Dearborn, Mich.

[73] Assignee: The Standard Products Company, Cleveland, Ohio

[21] Appl. No.: 980,930

[22] Filed: Nov. 23, 1992

[51] Int. Cl.$^5$ ............................................. B60J 1/16
[52] U.S. Cl. .................................... 49/377; 49/489.1; 49/498.1
[58] Field of Search .............. 49/374, 375, 377, 475.1, 49/489.1, 492.1, 498.1

[56] References Cited

U.S. PATENT DOCUMENTS

| 3,748,215 | 7/1973 | Lenzi | 49/498 X |
| 4,381,115 | 4/1983 | Ko | 49/498 X |
| 4,411,941 | 10/1983 | Azzola | 49/498 X |
| 4,442,634 | 4/1984 | Kimura . | |
| 4,628,639 | 12/1986 | Lownsdale | 49/498 |
| 4,689,916 | 9/1987 | Shimizu | 49/374 |
| 4,783,930 | 11/1988 | Tiesler | 49/375 X |
| 4,813,184 | 3/1989 | Weimar | 49/498 X |
| 4,937,126 | 6/1990 | Jackson | 49/498 X |
| 4,945,681 | 8/1990 | Nozaki et al. | 49/498 X |
| 4,970,102 | 11/1990 | Guillon | 49/498 X |
| 4,984,389 | 1/1991 | Benoit et al. . | |
| 4,989,371 | 2/1991 | Mancosu et al. | 49/498 X |

FOREIGN PATENT DOCUMENTS

| 2160920 | 1/1986 | United Kingdom | 49/475 |
| 2209788 | 5/1989 | United Kingdom | 49/489 |
| 2216163 | 10/1989 | United Kingdom | 49/475 |

Primary Examiner—Peter M. Cuomo
Assistant Examiner—Michael J. Milano
Attorney, Agent, or Firm—Harness, Dickey & Pierce

[57] ABSTRACT

A belt weatherstrip for an automotive vehicle door having a flush mounted window assembly is disclosed. This belt weatherstrip has a body portion with attaching members for attaching the weatherstrip to the door assembly. A trim member extends from the body portion into a gap located between an outer door panel and the window assembly when the window assembly is in a closed position. The trim member provides the gap with a show surface that is substantially flush with the exterior surfaces on both the window assembly and the door panel. In addition, a curved member extends from the body portion and sealingly engages a surface on the window assembly when the window assembly is in a closed position. This curved member also engages the window assembly as it moves between open and closed positions, thereby wiping water and debris from the window assembly. A supporting member extending between the body portion and the curved member applies pressure to the curved member thereby enhancing the sealing engagement between the curved member and the window assembly. Moreover, the supporting member prevents a portion of the curved member from interfering with the window assembly as it is raised to its closed position.

20 Claims, 2 Drawing Sheets

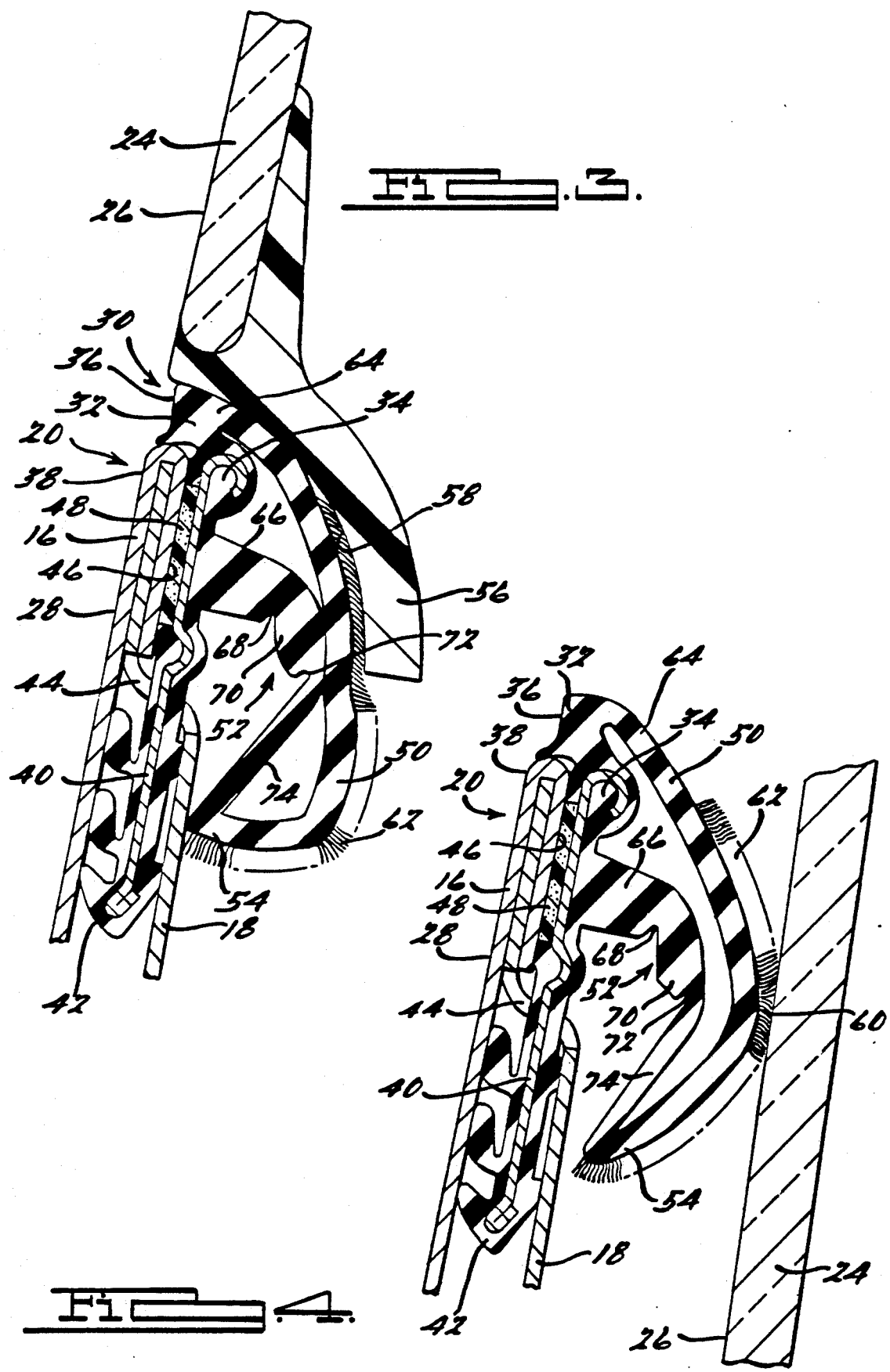

BELT WEATHERSTRIP WITH BULB

BACKGROUND AND SUMMARY OF THE INVENTION

This invention relates generally to automotive weatherstripping and more particularly to a belt weatherstrip member for a flush mounted within an automotive vehicle door assembly.

Typically, an automotive vehicle door has inner and outer panels, a sliding glass window assembly and a belt weatherstrip member disposed between the glass and the door panels. The weatherstrip member seals and aesthetically masks the gap between the window and the door panel. The outer door panel generally extends from a lower portion of the door upward to the window opening. At the window opening, many outer door panels curve inwardly creating a generally horizontal shelf that extends toward the interior of the vehicle. This shelf is generally undesirable for numerous reasons. For example, a shelf causes an unsightly discontinuity in the profile curvature of a vehicle door and can create aerodynamic drag and substantial wind noise at high speeds. Moreover, a rather large unsightly belt weatherstrip is required to conceal the discontinuity and the gap between the outer door panel and the window assembly.

In order to eliminate the need for a large belt weatherstrip, automotive vehicle doors now utilize a hem flange to prevent the creation of a shelf. These doors also utilize a window assembly that slides upwardly and articulates outwardly into a closed position. Once the window is closed, the outer surface of the door panel and the outer surface of the window assembly are generally flush with one another, leaving only a small gap therebetween. Accordingly, it is most desirable to provide a belt weatherstrip that fills this gap and provides a show surface that is generally flush with the outer surface of the door. Moreover, it is desirable to provide a belt weatherstrip that effectively seals the gap while the window is both moving and stationary. In addition, it would be desirable to have a belt weatherstrip that wipes the exterior surface of the window while it is moving between its open and closed positions.

The belt weatherstrip of the present invention has been adapted to provide each of these desirable features with a unique one piece configuration. This one piece configuration utilizes a resilient curved member for both wiping and sealing the window as it moves, and for sealing the window in a closed position. The weatherstrip also utilizes a novel supporting member which controls the amount of pressure that the curved member applies to the window, thereby providing for effective sealing and wiping of the window in all positions. In addition, the weatherstrip has a trim portion that fills the gap between the door panel and the window and provides a show surface that is flush with the exterior door surface.

Additional objects, advantages, and features of the present invention will become apparent from the following description and appended claims, taken in conjunction with the accompanying drawings.

BRIEF DESCRIPTION OF THE DRAWINGS

FIG. 3 is a cross sectional view taken along section 3—3 in FIG. 1 illustrating the belt weatherstrip of the present invention with the window assembly in a closed position; and FIG. 4 is a cross sectional view similar to FIG. 3 of the belt weatherstrip of the present invention as the window assembly is moved either upwardly or downwardly between the open and closed positions.

DETAILED DESCRIPTION OF THE PREFERRED EMBODIMENT

Figure 1:
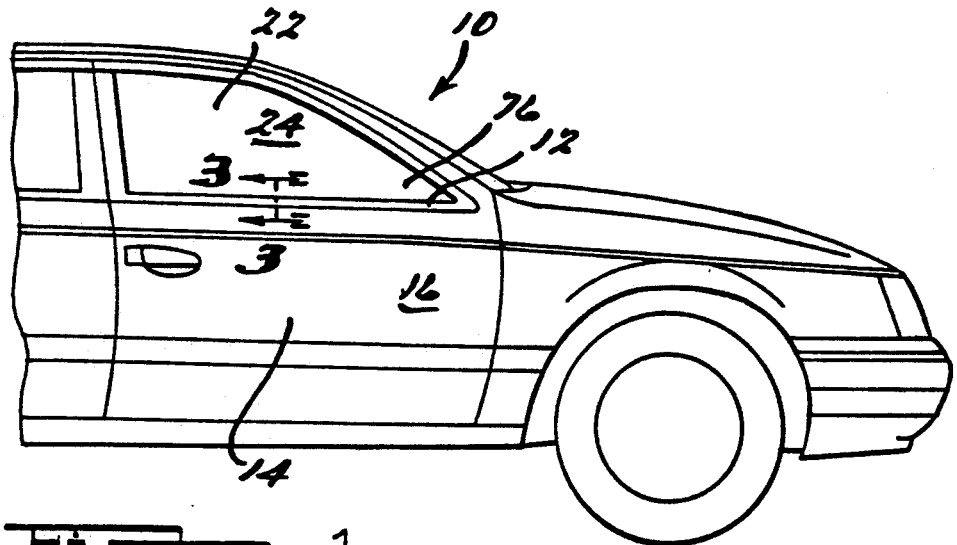
FIG. 1 is a side view of a portion of an automotive vehicle having a side door with a window assembly that utilizes a belt weatherstrip in accordance with the principles of the present invention.

Referring now to the drawings and in particular FIG. 1, an automotive vehicle 10 utilizing the belt weatherstrip 12 of the present invention is shown. This particular vehicle 10 utilizes a side door assembly 14 having an outer panel 16 and an inner reinforcement panel 18 that are attached to one another by a hem flange 20, as shown in FIGS. 3 and 4. The door assembly 14 also utilizes a window assembly 22 that slides upwardly and articulates outwardly to a closed position, and that articulates inwardly and slides downwardly to an open position. In other words, when the window assembly 22 is open, the glass panel 24 is positioned slightly toward the interior of the vehicle 10 relative to the door panel 16, as shown in FIG. 4. As the window assembly 22 is raised and it approaches its fully closed position, the glass panel 24 is articulated outwardly. Thus, the outer surface 26 of the glass panel 24 is substantially flush with the outer surface 28 of the door panel 16 and only a small gap 30 is created therebetween, as shown in FIG. 3.

The belt weatherstrip 12 of the present invention is specially adapted to accommodate this type of door assembly 14 and particularly this type of window movement. As shown in FIG. 3, a trim member 32 integrally extends upwardly from the body portion 34 of the weatherstrip 12 and fills the gap 30 between the door assembly 14 and the window assembly 22. As further shown in FIG. 3, this trim member 32 has a show surface 36 that is substantially coplanar with adjacent exterior surfaces 26 and 28 on both the door and window panels 16 and 24. Thus, the trim member 32 provides a smooth exterior profile at the gap 30 in the door assembly 14.

In order to rigidly mount the trim member 32 within this gap 30, without hooking the trim member 32 over the exterior surface 38 of the hem flange 20, the weatherstrip 12 must be both rigid and fixedly secured to the door assembly 14. As can be seen from FIG. 2, a rigid core member 40 provides the desired structural rigidity to the weatherstrip 12 and further provides a method for fixedly securing the weatherstrip 12 to the door panel 16. Note that this core 40 is preferably made of a metallic material such as steel or aluminum.

Figure 2:
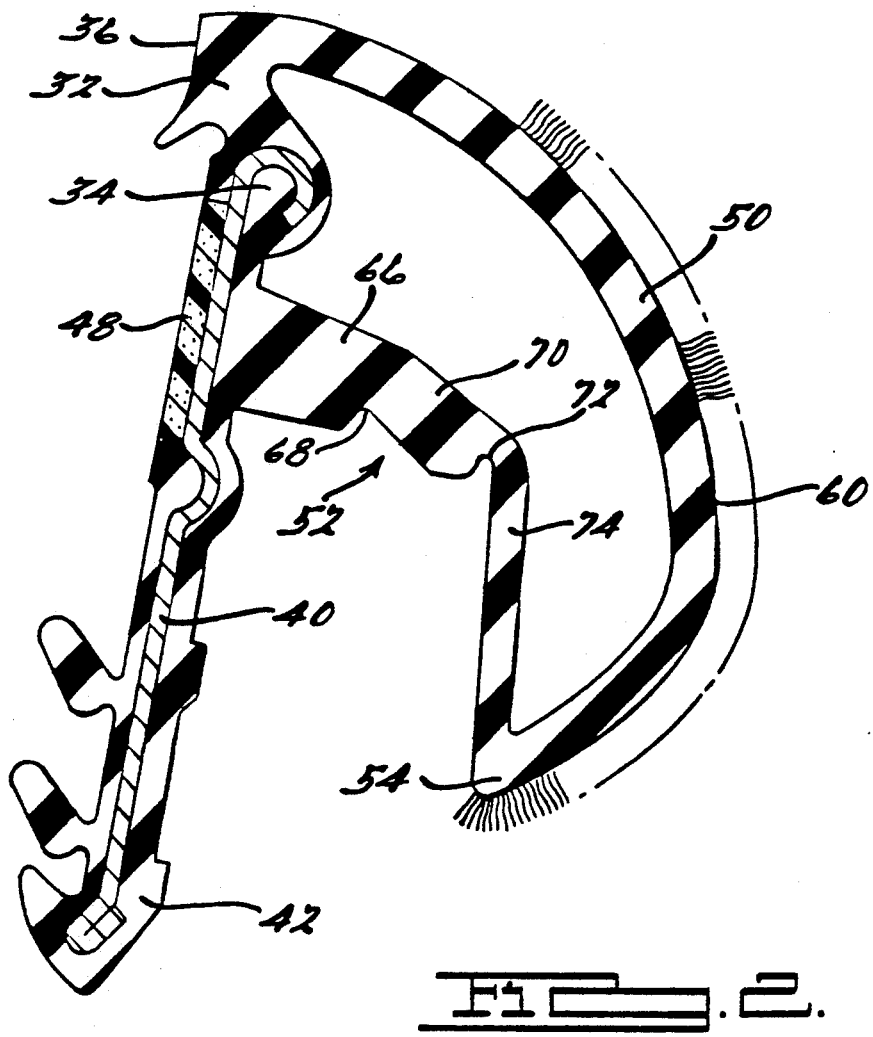
FIG. 2 is a cross sectional view of the belt weatherstrip with the sealing member and supporting member in a relaxed position.

In short, the weatherstrip 12 is attached by a plurality of dart-like attaching members 42 that integrally extend downwardly from a body portion 34 of the weatherstrip 12. These dart members 42 are inserted through apertures 44 in the reinforcing inner door panel 18 such that the dart members 42 engage both the inner and outer door panel members 16 and 18. Once the dart members 42 are inserted, the lower portion of the rigid core member 40 is locked between the inner and outer door panel members 16 and 18. Thus, the upper portion of the core member 40 that extends upwardly, parallel to the hem flange 20, is held tightly against the interior surface of the hem flange 46. Note, that weatherstrip 12 can be adapted to receive a double-sided adhesive tape 48 that directly secures the upper portion of the core member 40 to the hem flange 20, as shown in FIG. 2. These attaching methods are fully disclosed in co-pending U.S. patent application Ser. No. 07/978,923 (pending) filed on Nov. 19, 1992, for a "WAIST BELT WITH SEMI-FLUSH WEATHERSTRIP" by inventor Robert A. Vaughan, which is incorporated herein by reference.

The weatherstrip 12 of the present invention also utilizes a curved member 50, that integrally extends from the upper end of the body portion 34, and a supporting member 52 that integrally extends between the body portion 34 and a distal end of the curved member 54. One purpose of the curved member 50 is to provide a substantial surface area that can sealingly engage with a portion of the window assembly 22. As best illustrated in FIG. 3, the window assembly 22 has a rigid member 56 affixed to the glass panel 24 that provides a corresponding curved sealing surface 58. The curvature of this surface 58 corresponds to the curvature of the curved member 50 and preferably, the width of this sealing surface 58 is substantially greater than the width of the glass panel 24. Thus, a substantial area on this sealing surface 58 is engaged by the curved member 50 when the window assembly 22 is in its closed position. Note, another purpose of the curved member 50 is to wipe any water or other foreign matter from the exterior surface 26 of the glass panel 24 as it is moved. When the window assembly 22 is being raised or lowered, as shown in FIG. 4, an intermediate portion 60 of the curved member 50 engages and wipes the glass panel 24.

As shown in FIG. 2, a conventional flocking material 62 is affixed to portions of this curved member 50. The flocking material 62 provides a low friction surface for the glass panel 24 to slide across. In addition, the flocking 62 prevents water from seeping between the curved member 50 and the window assembly 22 by using the surface tension in the water droplets to effectively trap the water droplets within the flocking material 62. It should also be noted that a coating of conventional anti-freeze material (not shown) can be placed over the upper portion 64 of the curved member 50 and over a portion of the adjacent flocking material 62 to prevent that portion of the weatherstrip 12 from freezing.

The supporting member 52 of the present invention extends between the body portion 34 and the distal end 54 of the curved member 50 and is divided into three distinct portions by a pair of living hinges. The first portion 66 extends between the body portion 34 and a first living hinge 68; the second portion 70 extends between the first living hinge 68 and a second living hinge 72; and the third portion 74 extends between the second living hinge 72 and the distal end of the curved member 54. Each of these three portions 66, 70 and 74 provides a distinct function for the weatherstrip 12 of the present invention.

The first portion 66 anchors the second portion 70 such that the second portion 70 is in a position adjacent to the curved member 50. Accordingly, when the window assembly 22 is moved to its closed position, and the rigid member 56 sealingly engages the curved member 50, an intermediate portion 60 of the curved member 50 is deflected into the second portion 70 of the supporting member 52, as shown in FIG. 3. As the window assembly 22 is articulated outwardly, the second portion 70 of the supporting member 52 applies pressure to the curved member 50 thereby enhancing its sealing engagement with the rigid member 56. The first living hinge 68 controls the amount of this pressure by allowing the second portion 70 of the supporting member 52 to rotate as it is engaged. By allowing the second portion 70 to rotate, the first living hinge 68 stabilizes the pressure on the curved member 50 by preventing the pressure from substantially increasing as the curved member 50 is further deflected into the second portion 70.

The first living hinge 68 also provides a stabilizing effect to the curved member 50 as the curved member 50 wipes the glass panel 24. In other words, when the window assembly 22 is being raised and lowered, an intermediate portion 60 of the curved member 50 resiliently engages and wipes the exterior surface 26 of the glass panel 24 as shown in FIG. 4. As the window assembly 22 moves, discontinuities in the exterior surface 26 of the glass panel 24 will cause the panel 24 to deflect the intermediate portion 60 closer to, and further away from, the supporting member 52. To stabilize the amount of wiping pressure being applied by the intermediate portion 60 when it is deflected, the first living hinge 68 permits the second and third portions 70 and 74 of the supporting member 52 to rotate inwardly and outwardly. Since the stresses within the first living hinge 68 generally deliver a constant load in the direction of the glass panel 24, the wiping pressure applied is relatively constant, irrespective of the small degree of rotation by the second and third portions 70 and 74. Thus, the curved member 50 does not apply too much pressure, and therefore does not create friction that could cause the curved member 50 to roll and malfunction.

Another situation where the curved member 50 can roll and malfunction is when the forward most portion 76 of the glass panel 24 is lowered and has dropped below and disengaged from the weatherstrip 12. As the window 22 is subsequently raised, the forward portion 76 of the glass panel 24 may improperly re-engage the weatherstrip 12. For example, the upper edge (not shown) of the glass panel 24 may engage the distal end portion 54 of the curved member 50 or, worse yet, the glass panel 24 could miss the curved member 50 altogether and engage the supporting member 52. This type of improper engagement could cause the curved portion 50 to be driven upwardly, thereby causing the weatherstrip 12 to roll and malfunction.

To avoid this problem, a second living hinge 72 is provided on the supporting member 52. This second living hinge 72 causes the third portion 74 of the supporting member 52 to rotate toward the door panel 16 when the window 22 engages the weatherstrip 12. As shown in FIG. 4, this causes the distal end 54 of the curved member 50 to move outwardly, toward the door panel 16, and prevents it from interfering with the window assembly 22 as it is raised. Thus, so long as a small portion of the glass panel 24 remains in contact with the curved member 50, the entire length of the distal end 54 of the curved member 50 will remain retracted, thereby preventing it from interfering with the raising of the window 22.

In addition to being versatile in its application, the weatherstrip 12 of the present invention is also easily manufactured by a conventional extrusion process. A resilient material is extruded onto the core member 40 as the core member 40 passes through a die. Note, the resilient material is preferably a rubber material, however, other materials such as a thermoplastic, or the like may also be utilized. After extruding the material onto the core member 40, portions of the core member 40 and the resilient material are removed to create the attaching darts 42, as disclosed more fully in the above-identified co-pending U.S. patent application filed on Nov. 19, 1992. Accordingly, the weatherstrip 12 of the present invention not only provides an aesthetic, substantially, coplanar show surface between the door panel 16 and window 22, while simultaneously wiping and sealing the window 22 in all positions, this weatherstrip 12 is also easily manufactured by conventional processes.

The foregoing discussion discloses and describes merely exemplary embodiments of the present invention. One skilled in the art will readily recognize from such discussion, and from the accompanying drawings and claims, that various changes, modifications and variations can be made therein without departing from the spirit and scope of the invention as defined in the following claims.

I claim:

1. An improved belt weatherstrip for an automobile vehicle, comprising:
   (a) a relatively rigid body portion;
   (b) attaching means for attaching said body portion to an automotive vehicle door assembly, said door assembly having an outer door panel with an exterior surface and a sliding window assembly that moves between an open position and a closed position, said window assembly having an exterior surface;
   (c) a trim member extending from said body portion into a space between said outer door panel of said door assembly and said sliding window assembly such that a show surface on said trim member is substantially coplanar with adjacent exterior surfaces of said window assembly and said outer door panel of said door assembly when said window assembly is in said closed position;
   (d) sealing means extending from said body portion for sealingly engaging a surface on said window assembly when said window assembly is in said closed position, and for wiping said exterior surface of said window assembly when said window assembly is moving between said open and closed positions; and
   (e) supporting means extending between said sealing means and said body portion for serving the dual purpose of supporting the sealing engagement between said sealing means and said window assembly in said closed position, and for preventing an end portion of said sealing means from interfering with said window assembly while said window assembly is moving between said open and closed positions.

2. The belt weatherstrip of claim 1 wherein said body portion has a metal reinforcing core member.

3. The belt weatherstrip of claim 1 wherein a portion of said sealing means is covered with flocking.

4. The belt weatherstrip of claim 1 wherein a portion of said sealing means is coated with an anti-freeze coating.

5. The belt weatherstrip of claim 1 wherein said sealing means further comprises a resilient curved member extending between said body portion and said supporting means, thereby forming a bulbous shaped member extending from said body portion.

6. The belt weatherstrip of claim 1 wherein said supporting means is a resilient member having first and second living hinges.

7. The belt weatherstrip of claim 6 wherein said first living hinge permits a portion of said supporting means to deflect as the sealing means is displaced into abutting engagement with the supporting means by said window assembly.

8. The belt weatherstrip of claim 6 wherein said second living hinge permits a portion of said supporting means to rotate when said sealing means is displaced by said window assembly, thereby moving said end portion of said sealing means away from the window assembly.

9. A belt weatherstrip for an automotive vehicle door assembly having a sliding window assembly that moves between an open position and a closed position, said belt weatherstrip comprising:
   (a) a body portion having a rigid core member disposed therein;
   (b) a plurality of attaching members integrally extending from said body portion for attaching said body portion to said automotive vehicle door assembly;
   (c) a trim member integrally extending from said body portion into a space between said door assembly and said window assembly when said window assembly is in a closed position, said trim member having a show surface that is substantially flush with adjacent exterior surfaces on said window assembly and said door assembly;
   (d) a curved member integrally extending from said body portion for serving the dual purpose of sealingly engaging a corresponding curved surface on said window assembly when said window assembly is in said closed position, and wiping said exterior surface on said window assembly as said window assembly moves between said open and closed positions; and
   (e) a supporting member integrally extending between said body portion and one end of said curved member, said supporting member having first and second living hinges thereby dividing said supporting member into a first portion extending between said body portion and said first living hinge, a second portion between said first and second living hinges and a third portion between said second living hinge and said curved member, wherein:
   said first portion supports said second portion in a position adjacent to said curved member such that when said window assembly is moved to said closed position and said curved member is sealingly engaged with said corresponding curved surface on said window assembly, said second portion abuts said curved portion thereby supporting said sealing engagement; and
   said third portion rotates with respect to said second living hinge when said curved member engages said window exterior surface such that said third portion forces said one end of said curved member away from said window assembly.

10. The belt weatherstrip of claim 9 wherein a portion of said curved member is covered with flocking.

11. The belt weatherstrip of claim 9 wherein a portion of said curved member is coated with an anti-freeze material.

12. The belt weatherstrip of claim 9 wherein said body portion, said curved member and said supporting member form a bulbous member extending from the body portion.

13. The belt weatherstrip of claim 9 wherein said first living hinge controls the amount of pressure said curved member applies to said exterior surface of said window assembly.

14. An automotive vehicle door sealing system comprising:
(a) a door assembly;
(b) a sliding window assembly that moves between an open position and a closed position within said door assembly, said window assembly having a glass panel and a rigid member affixed to said glass panel for providing a sealing surface having a width substantially greater than the width of said glass panel;
(c) a belt weatherstrip member extending into a space between said window assembly and an exterior door panel within said door assembly such that a show surface on said belt weatherstrip is substantially flush with exterior surfaces on said exterior door panel and said window assembly, said belt weatherstrip having:
a resilient curved member having a surface that corresponds to said sealing surface on said window assembly, said curved member engaging a substantial portion of said sealing surface on said rigid member when said window assembly is in a closed position;
a supporting member positioned adjacent to said curved member such that when said curved member is engaged by said sealing surface, a portion of said supporting member abuts said curved member, thereby supporting said sealing engagement between said curved member and said sealing surface; and
said supporting member having a living hinge that allows said portion of the supporting member engaging the curved member to rotate as the sealing surface engages the curved member such that loads applied by the supporting member to the curved member are generally prevented from substantially increasing as the curved member is displaced in the direction of the supporting member.

15. The sealing system of claim 14 wherein said supporting member further comprises a second living hinge that prevents a portion of the curved member from interfering with the window assembly as the window assembly is moved between open and closed positions.

16. The sealing system of claim 14 wherein said weatherstrip member is an extrusion.

17. The sealing system of claim 14 wherein a portion of said curved member is covered with flocking.

18. The sealing system of claim 14 wherein a portion of said curved member is coated with an anti-freeze material.

19. The sealing system of claim 14 wherein said belt weatherstrip further comprises attaching means for attaching said belt weatherstrip to said door assembly.

20. The sealing system of claim 14 wherein said curved member engages said glass panel when said glass panel is moved between said open and closed positions, thereby wiping an exterior surface on said glass panel.

* * * * *